United States Patent
Yamamoto et al.

(10) Patent No.: US 9,711,791 B2
(45) Date of Patent: Jul. 18, 2017

(54) NON-AQUEOUS ORGANIC ELECTROLYTE SECONDARY CELL

(71) Applicant: NISSAN MOTOR CO., LTD., Yokohama-shi, Kanagawa (JP)

(72) Inventors: Shinji Yamamoto, Yokosuka (JP); Hideaki Tanaka, Yokohama (JP); Hajime Satou, Ebina (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 14/418,787

(22) PCT Filed: Jun. 19, 2013

(86) PCT No.: PCT/JP2013/066797
§ 371 (c)(1),
(2) Date: Jan. 30, 2015

(87) PCT Pub. No.: WO2014/021014
PCT Pub. Date: Feb. 6, 2014

(65) Prior Publication Data
US 2015/0155555 A1    Jun. 4, 2015

(30) Foreign Application Priority Data

Aug. 2, 2012  (JP) .................................. 2012-171629

(51) Int. Cl.
*H01M 4/505* (2010.01)
*H01M 10/0568* (2010.01)
(Continued)

(52) U.S. Cl.
CPC .......... *H01M 4/505* (2013.01); *H01M 4/525* (2013.01); *H01M 4/625* (2013.01); *H01M 10/0525* (2013.01); *H01M 10/0567* (2013.01); *H01M 10/0568* (2013.01); *H01M 10/0569* (2013.01); *H01M 2220/20* (2013.01);
(Continued)

(58) Field of Classification Search
None
See application file for complete search history.

(56) References Cited

U.S. PATENT DOCUMENTS 6,803,150 B1 * 10/2004 Iriyama ............... H01M 2/0222
252/502
2008/0085452 A1 * 4/2008 Park ....................... H01M 4/131
429/220

FOREIGN PATENT DOCUMENTS

JP    2007-095443 A    4/2007
JP    2008-027833 A    2/2008
(Continued)

*Primary Examiner* — Daniel Gatewood
(74) *Attorney, Agent, or Firm* — Foley & Lardner LLP

(57) ABSTRACT

In a non-aqueous organic electrolyte secondary cell, the counter charge capacity ratio (A/C) between the cathodes and the anodes represented by the following formula is set to within the range from 1.10 to 1.35, $$A/C = \beta \times (\text{anode charge capacity} \times \alpha)/(\text{cathode charge capacity} \times \eta \times \tau)$$

where $\alpha$ is the electrode area coefficient defined as (anode area)/(cathode area) and $\alpha > 1.0$, $\beta$ is a design coefficient and $0.85 \leq \beta \leq 1.15$, $\eta$ is the charge-discharge efficiency ratio defined as (charge-discharge ratio at 25° C.)/(charge-discharge ratio at 55° C.), and $\tau$ is the temperature characteristic coefficient defined as (charge capacity at 55° C.)/(charge capacity at 25° C.).

1 Claim, 2 Drawing Sheets (51) Int. Cl.
*H01M 4/525* (2010.01)
*H01M 10/0525* (2010.01)
*H01M 10/0567* (2010.01)
*H01M 10/0569* (2010.01)
*H01M 4/62* (2006.01)

(52) U.S. Cl.
CPC .... *H01M 2300/0025* (2013.01); *Y02E 60/122* (2013.01); *Y02T 10/7011* (2013.01)

(56) References Cited

FOREIGN PATENT DOCUMENTS

| | | | |
|---|---|---|---|
| JP | 2008027833 A | * | 2/2008 |
| JP | 2011-258564 A | | 12/2011 |

* cited by examiner

NON-AQUEOUS ORGANIC ELECTROLYTE SECONDARY CELL

TECHNICAL FIELD

The present invention relates to a non-aqueous organic electrolyte secondary cell that is suitably used for, for example, a drive power supply of electric vehicles, fuel cell vehicles, hybrid electric vehicles and the like.

BACKGROUND ART

In recent years, it has been seriously desired to reduce carbon dioxide emission in order to cope with air pollution and global warming. In the automobile industry for example, introduction of electric vehicles (EV), hybrid electric vehicles (HEV) and the like is expected to reduce carbon dioxide emission. For this reason, development of secondary cells for driving a motor, which is a key to a practical use of these vehicles, has been actively made.

Among secondary cells for driving a motor, lithium-ion secondary cells have drawn attention for the high theoretical energy, and the development thereof has been being made in a rapid pace. A typical lithium ion secondary cell includes a cathode that is formed by applying a cathode slurry containing a cathode active material on the surface of a current collector, an anode that is formed by applying an anode slurry containing an anode active material on an anode current collector, an electrolyte disposed between the cathode and the anode, and a cell case that houses the cathode, the anode and the electrolyte.

Selection of such active materials is of great importance in order to improve the capacity properties and the output properties of lithium-ion secondary cells.

For example, Patent Document 1 describes a proposal for improving the thermal stability of a non-aqueous electrolyte secondary cell that uses a lithium-containing transition metal oxide of a predetermined composition as a base material of the cathode active material, in which the cell is configured to have a counter charge capacity ratio between the anode and the cathode of 1.0 to 1.15 when it is charged until the potential of the cathode reaches 4.5 V.

CITATION LIST

Patent Literature

Patent Document 1: Japanese Patent Unexamined Publication No. 2007-95443

SUMMARY OF INVENTION

Technical Problem

However, while the non-aqueous electrolyte secondary cell of the Patent Document 1 has a good thermal stability and therefore has an improved safety profile due to the specific counter charge capacity ratio, the cycling characteristics thereof is not sufficiently good.

The present invention has been made in consideration of such problems with the prior art, and an object thereof is to provide a non-aqueous organic electrolyte secondary cell with a high charge capacity and good cycling characteristics.

Solution to Problem

As a result of diligent and constant study for achieving the above object, the present inventors have found that the above-described problem can be solved by setting the anode charge capacity/the cathode charge capacity to within a redetermined range or by setting the counter charge capacity ratio (A/C) between a cathode and an anode determined by a predetermined expression to within a predetermined range, and further by using, as the cathode active material, a lithium-containing transition metal oxide solid solution that has a layered crystal structure and is represented by a predetermined compositional formula. The present invention was thus completed.

That is, the present invention, which is based on the above-described findings, is a non-aqueous organic electrolyte secondary cell including: a cathode that contains a cathode active material capable of occluding/releasing lithium ions; an anode that contains an anode active material capable of occluding/releasing lithium ions; a separator to separate the cathode and the anode from each other; and an electrolytic solution including a mixture of an organic solvent and a lithium salt electrolyte, wherein the anode charge capacity/the cathode charge capacity is within the range from 1.28 to 1.55, or the counter charge capacity ration (A/C) between the cathode and the anode represented by the following expression is within the range from 1.10 to 1.35, and wherein the cathode active material is constituted by a lithium-containing transition metal oxide that has a layered crystal structure and is represented by the following compositional formula (1).

$$A/C = \beta \times (\text{anode charge capacity} \times \alpha) / (\text{cathode charge capacity} \times \eta \times \tau)$$

where $\alpha$ is the electrode area coefficient defined as (anode area)/(cathode area) and $\alpha > 1.0$, $\beta$ is a design coefficient and $0.85 \le \beta \le 1.15$, $\eta$ is the charge-discharge efficiency ratio defined as (charge-discharge ratio at 25° C.)/(charge-discharge ratio at 55° C.), and $\tau$ is the temperature characteristic coefficient defined as (charge capacity at 55° C.)/(charge capacity at 25° C.).

$$Li_{1.5}[Ni_a Co_b Mn_c [Li]_d]O_3 \quad (1)$$

where a, b, c and d satisfy $0 < a < 1.4$, $0 \le b < 1.4$, $0 < c < 1.4$, $0.05 \le d \le 0.5$, $a+b+c+d=1.5$ and $1.0 \le a+b+c \le 1.4$.

Advantageous Effects of Invention

The non-aqueous organic electrolyte secondary cell of the present invention has high discharge capacity and good cycling characteristics since the anode charge capacity/the cathode charge capacity is within the range from 1.28 to 1.55, or the counter charge capacity ratio (A/C) defined by the predetermined expression, namely $\beta \times$(anode charge capacity$\times \alpha$)/(cathode charge capacity$\times \eta \times \tau$), is within the range from 1.10 to 1.35, and the cathode active material is constituted by a lithium-containing transition metal oxide that has a layered crystal structure and is represented as $Li_{1.5}[Ni_a Co_b Mn_c [Li]_d]O_3$ (where a, b, c and d satisfy $0 < a < 1.4$, $0 \le b < 1.4$, $0 < c < 1.4$, $0.05 \le d \le 0.5$, $a+b+c+d=1.5$ and $1.0 \le a+b+c \le 1.4$).

DESCRIPTION OF EMBODIMENTS

Hereinafter, a non-aqueous organic electrolyte secondary cell of the present invention will be described in detail.

As described above, the non-aqueous organic electrolyte secondary cell of the present invention includes: a cathode that contains a cathode active material capable of occluding/releasing lithium ions; an anode that contains an anode active material capable of occluding/releasing lithium ions; a separator to separate the cathode and the anode from each other; and an electrolytic solution consisting of a mixture of an organic solvent and a lithium salt electrolyte. Furthermore, the counter charge capacity ratio (A/C) between the cathode and the anode represented by the following expression is within the range from 1.10 to 1.35.

$$A/C = \beta \times (\text{anode charge capacity} \times \alpha)/(\text{cathode charge capacity} \times \eta \times \tau)$$

In the above expression that represents the A/C, $\alpha$ (electrode area coefficient) is the ratio of the area (cm$^2$) of the anode to the area (cm$^2$) of the counter cathode, provided the area of the anode is always larger. $\beta$ (design coefficient) ranges from 0.85 to 1.15, i.e. ranges by ±15% with respect to the center value "1".

Further, $\eta$ (charge-discharge efficiency ratio) is defined as (charge-discharge efficiency at 25° C.)/(charge-discharge efficiency at 55° C.). A charge-discharge efficiency is a ratio of discharge capacity to charge capacity and is defined as (charge capacity)/(discharge capacity). Furthermore, $\tau$ (temperature characteristic coefficient) is defined as (charge capacity at 55° C. (mAh·g$^{-1}$))/(charge capacity at 25° C. (mAh·g$^{-1}$)).

In the non-aqueous organic electrolyte secondary cell of the present invention, the above-described counter charge capacity ratio (A/C) is desirably within the range from 1.10 to 1.35 when it is charged at the upper limit temperature of the usage environment.

Further, in the present invention, a lithium-containing transition metal oxide solid solution with layered crystal structure of the following compositional formula (1) is used as the cathode active material contained in the cathode.

$$Li_{1.5}[Ni_aCo_bMn_c[Li]_d]O_3 \tag{1}$$

In the above compositional formula (1), a, b, c and d satisfy $0<a<1.4$, $0 \leq b<1.4$, $0<c<1.4$, $0.05 \leq d \leq 0.5$, $a+b+c+d=1.5$ and $1.0 \leq a+b+c \leq 1.4$.

Lithium nickel oxide, lithium manganese oxide, lithium cobalt oxide, ternary composite oxides and the like are lithium-containing composite oxides known in the art that can be used as a cathode active material. They have respectively the following demerits as well as the characteristics.

Lithium nickel oxide is characterized by high capacity. However, it has a demerit of low safety profile because the oxygen in the crystal structure is easily released at a high temperature and thus induces fire or explosion. Furthermore, it also has demerits of low discharge operating voltage (3.5 V on average) and poor cycling characteristics.

Lithium manganese oxide has good safety profile (resistant to overvoltage and therefore low risk of fire) and a high discharge operating voltage (3.8 V on average), and the natural resource thereof is abundant. However, it has a low capacity and a low energy density. Furthermore, it also has demerits of poor charge-discharge cycling durability and poor storage stability because manganese itself dissolves at a high temperature.

Lithium cobalt oxide is characterized by the second highest capacity to lithium nickel oxide, high discharge operating voltage (3.7 V on average), good reversibility within the voltage range from 2.5 to 4.3 V, and good balance between the cycling characteristics and the rate characteristics. However, it also has demerits. Since it cannot maintain the crystal structure depending on the amount of Lithium extracted, the theoretical capacity cannot be fully utilized (approximately only a half of the capacity is available). Furthermore, Co is a rare metal that is limited in natural resource and is therefore costly.

Ternary composite oxides are characterized by a good balance between the capacity, the cycling characteristics and the rate characteristics. However, it inherits the characteristics of nickel-based lithium-containing composite oxides to a great extent, and therefore has demerits of low initial charge-discharge efficiency and poor cycling characteristics compared to lithium cobalt oxide.

Meanwhile, composite oxide solid solutions have merits of high capacity, high energy density, good cycling characteristics due to the stable crystal structure and the like. However, compared to lithium cobalt oxide, it has demerits of low discharge operating voltage, large hysteresis, low initial charge-discharge efficiency and poor rate characteristics, large fluctuation in discharge capacity depending on operating temperature, and the like.

In the present invention, a lithium-containing transition metal oxide solid solution with a layered structure: $Li_{1.5}[Ni_aCo_bMn_c[Li]_d]O_3$ ($0<a<1.4$, $0 \leq b<1.4$, $0<c<1.4$, $0.05 \leq d \leq 0.5$, $a+b+c+d=1.5$ and $1.0 \leq a+b+c \leq 1.4$) is used for the cathode, and the cell is configured to have a counter charge capacity ratio between the cathode and the anode within the range from 1.10 to 1.35 when the cell is charged at the upper limit temperature of the usage environment until the potential of the cathode using the solid solution reaches the potential plateau region.

The configuration makes it possible to overcome demerits such as low initial charge-discharge efficiency, large hysteresis, large fluctuation in charge capacity depending on use temperature and the like, while maintaining the merits of lithium-containing composite oxide solid solutions such as high energy density, high discharge capacity, stable crystal structure and good cycling characteristics. If the values of a, b, c or d do not satisfy the above-described relationship, it is likely to become more difficult to stabilize the structure of the lithium-containing transition metal oxide solid solution.

In the present invention, if the counter capacity ratio (A/C) between the cathode and the anode is less than 1.00 in a charged state, the Li (metal) that is not absorbed in the anode active material is deposited to deteriorate the safety profile and the cycling characteristics. Furthermore, cells using a composite oxide solid solution for the cathode active material have drawbacks such as low initial charge-discharge efficiency, large fluctuation in discharge capacity depending on a use temperature and the like compared to conventional cathode active materials. Accordingly, if the A/C is less than 1.10, sufficient cycling characteristics cannot be achieved. For this reason, optimization of the A/C is of importance compared to conventional cells. If the A/C is greater than 1.35, the irreversible capacity is increased, or the advantageous effects of the optimization of the A/C is saturated, which results in a disadvantage of an unnecessarily higher cost.

Further, in the present invention, in terms of further reducing the above-described demerits of lithium-containing composite oxide solid solutions, it is desirable that a, b, c and d of the compositional formula (1) satisfies $0<a<1.3$, $0 \leq b < 1.3$, $0 < c < 1.3$, $0.05 \leq d \leq 0.5$, $a+b+c+d=1.5$ and $1.0 \leq a+b+c \leq 1.3$, and the lithium-containing transition metal oxide is treated with charge-discharge cycles within the range from 4.3 to 4.75 V so that the layered structure is partly changed to spinel structure, in which the change ratio k to the spinel structure is equal to or greater than 0.25 and less than 1 with respect to the theoretically possible structural change from the layered structure to the spinel structure.

As used herein, the term "change ratio k to spinel structure" represents the extent of change from layered $Li_2MnO_3$ to spinel $LiMn_2O_4$ in the lithium-containing transition metal oxide solid solution, which is caused by a charge or a charge-discharge within a predetermined potential range (4.3 to 4.75 V). Specifically, it represents the ratio of actual change to theoretical change where the amount of the layered structure ($Li_2MnO_3$) in the lithium-containing transition metal oxide that is theoretically changeable to the spinel structure ($LiMn_2O_4$) is taken as "1".

Specifically, the ratio is defined by the following expression.

$$\begin{pmatrix} \text{Change rate} \\ \text{to spinel} \\ \text{structure } (K) \end{pmatrix} = \frac{\begin{pmatrix} \text{Actual capacity} \\ \text{within plateau region} \end{pmatrix}}{\begin{pmatrix} \text{Theoretical capacity} \\ \text{based on } Li2MnO3 \\ \text{in solid solution} \\ (VS) \end{pmatrix} \times \begin{pmatrix} \text{Compositional ratio} \\ \text{of } Li2MnO3 \\ \text{in solid solution} \\ (x) \end{pmatrix}}$$

Figure 1:
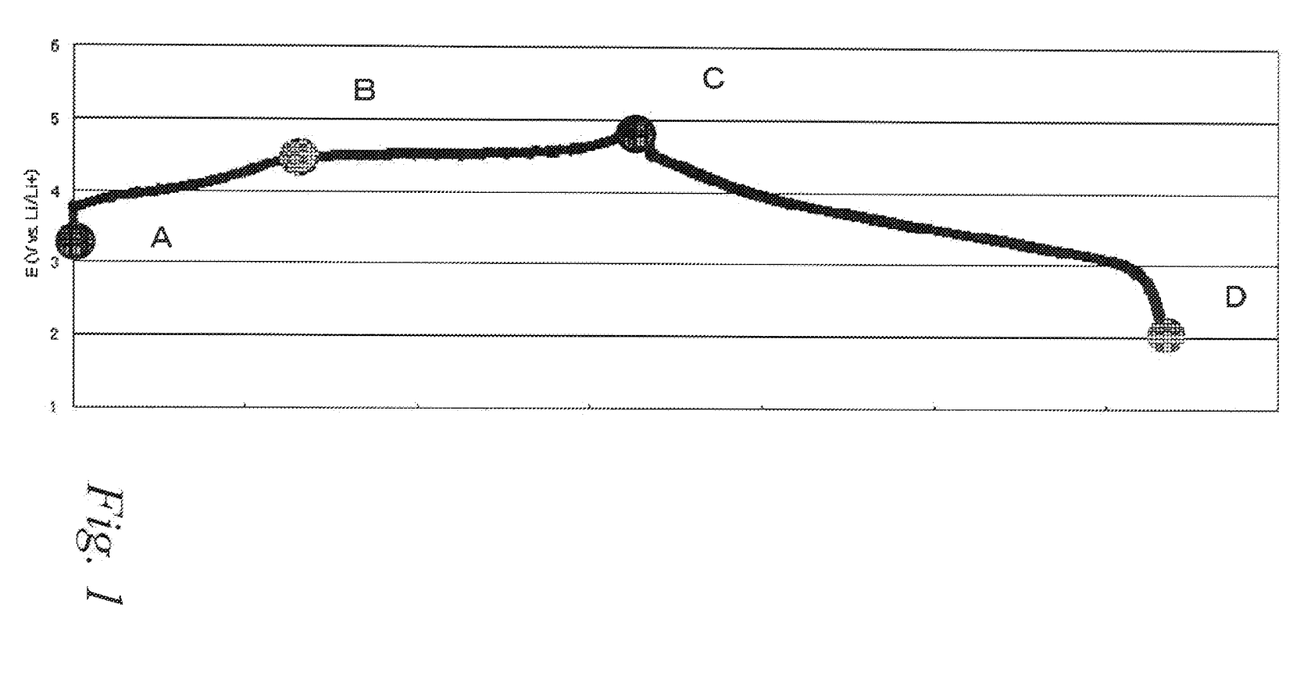
FIG. 1 is a graph for describing the definition of change rate to spinel structure.

The definition of the term "change ratio to spinel structure" will be described with an example illustrated in FIG. 1 where a cell with a cathode including the lithium-containing transition metal oxide solid solution as the cathode active material undergoes several states from an uncharged initial state A to a charged state B where the cell is charged to 4.5 V, to an overcharged state C where the cell is charged to 4.75 V via plateau region, and to a discharged state D where the cell is discharged to 2.0 V. The term "actual capacity within plateau region" of the above expression can be determined by measuring the actual capacity within the plateau region in FIG. 1 (specifically, the region from 4.5 V to 4.75 V where the crystal structure changes (the actual capacity $V_{BC}$ in the region BC ranging from the charged state B to the overcharged state C, the actual capacity within the plateau region)).

In practice, in the lithium-containing transition metal oxide solid solution of the above-described composition formula (1), the actual capacity $V_{AB}$, which is the capacity within the region AB from the initial state A to the charged state B where the cell is charged to 4.5 V, corresponds to the compositional ratio (y) and the theoretical capacity ($V_L$) of $LiMO_2$, the layered structure portion. The actual capacity $V_{BC}$, which is the capacity within the region BC from the charged state B where the cell is charged to 4.5 V to the overcharged state C where the cell is charged to 4.75 V, corresponds to the compositional ratio (x) and the theoretical capacity (Vs) of $LiMn_2O_3$, the spinel structure portion. Let the actual capacity ($V_T$) measured from the initial state A to a predetermined point in the plateau region be ($V_T=V_{AR}+V_{BC}$), $V_{AB}=y(V_L)$ and $V_{BC}=x(V_S)K$. Accordingly, the change rate to spinel structure can be calculated based on the following equation (M is at least one element selected from the group consisting of nickel (Ni), cobalt (Co) and manganese (Mn)).

$$\begin{pmatrix} \text{Change rate} \\ \text{to spinel} \\ \text{structure } (K) \end{pmatrix} =$$

$$\frac{\begin{pmatrix} \text{Cumulative} \\ \text{actual capacity} \\ \text{up to plateau} \\ \text{region } (VT) \end{pmatrix} - \begin{pmatrix} \text{Theoretical} \\ \text{capacity based} \\ \text{on } LiMO2 \text{ in} \\ \text{solid solution } (VL) \end{pmatrix} \times \begin{pmatrix} \text{Compositional} \\ \text{ratio of} \\ LiMO2 \text{ in solid} \\ \text{solution } (y) \end{pmatrix}}{\begin{pmatrix} \text{Theoretical capacity} \\ \text{based on} \\ Li2MnO3 \text{ in solid} \\ \text{solution } (VS) \end{pmatrix} \times \begin{pmatrix} \text{Compositional} \\ \text{ratio of} \\ Li2MnO3 \text{ in solid} \\ \text{solution } (x) \end{pmatrix}}$$

Further, the term "compositional ratio of $Li_2MnO_3$ in the solid solution" can be calculated from the composition formula of the lithium-containing transition metal oxide solid solution. The presence of the layered structure portion or the spinel structure portion in the lithium-containing transition metal oxide solid solution can be determined based on the presence of peaks specific to the layered structure or the spinel structure, and the ratios thereof can be determined by measuring/calculating the capacities as described above.

In the present invention, it is further desirable that the lithium-containing transition metal oxide used as the cathode active material has a change ratio k to spinel structure within the range from 0.35 to 0.85 and also has the feature that a, b, c and d of the compositional formula (1) satisfy $0.25 \leq a \leq 0.525$, $0 \leq b \leq 1.0$, $0 < c \leq 1.0$, $0.1 \leq d \leq 0.4$, $a+b+c+d=1.5$ and $1.1 \leq a+b+c \leq 1.25$.

In the lithium-containing transition metal oxide solid solution with the above properties, the above-described demerits of lithium-containing composite oxide solid solutions can be further reduced.

Further, it is preferred that the lithium-containing transition metal oxide solid solution has a BET specific surface area within the range from 0.8 m$^2$/g to 6.0 m$^2$/g and 50% cumulative diameter in the particle size distribution by mass (D50) of 10 μm or less.

Within these ranges, high discharge operating voltage and good initial rating characteristics can be achieved while high discharge capacity, high capacity retention and high initial charge-discharge efficiency are maintained.

If the BET specific surface area is less than 0.8 m$^2$/g, diffusion of lithium ions from the bulk of the crystal structure decreases, which may make it difficult to achieve high initial charge-discharge efficiency and good initial rating characteristics. Further, if the BET specific surface area is greater than 6.0 m$^2$/g and 50% cumulative diameter in the particle size distribution by mass is greater than 10 μm, the capacity retention may decreases.

Further, the cathode of the non-aqueous organic electrolyte secondary cell of the present invention contains a binder and a carbon material as a conductor aid. It is desirable that the content of the carbon material is equal to or less than 5 mass %, and the content of the binder is equal to or less than 5 mass % with respect to the total amount of the cathode active material, the carbon material and the binder. This can slow oxidative degradation of the electrolytic solution that occurs on the surface of the carbon used as the conductor agent, even when the potential of the cathode is high.

Next, the method for producing the lithium-containing transition metal oxide used in the present invention will be described in detail with some examples.

An example of the method for producing the precursor of the lithium-containing transition metal oxide is one using a carbonate method (composite carbonate method). First, sulfates, nitrates etc. of nickel (Ni), cobalt (Co) and manganese (Mn) are used as starting materials. Predetermined amounts of them are weighed to prepare a mixture solution thereof. Then, ammonia water is added dropwise to the mixture solution until the pH reaches 7. Subsequently, sodium carbonate ($Na_2CO_3$) aqueous solution is added dropwise so that a composite carbonate of Ni—Co—Mn is precipitated (While the $Na_2CO_3$ solution is being added dropwise, the solution is maintained at pH 7 with ammonia water.).

Then, the solution is filtered under reduced pressure, and the filtrate is washed with water, is dried and is then pre-calcined. The drying may be carried out under an air atmosphere in the conditions of 100° C. to 150° C. and approximately 2 to 10 hours (e.g. at 120° C. for 5 hours), but the drying condition is not limited to these ranges. The pre-calcining may be carried out in the conditions of 360° C. to 600° C., 3 to 10 hours under an air atmosphere (e.g. at 500° C. for 5 hours), but the pre-calcining condition is not limited to these ranges. Then, a slightly excess amount of lithium hydroxide ($LiOH.H_2O$) is added and mixed to the pre-calcined product. Thereafter, the mixture is calcined. The precursor of the lithium-containing transition metal oxide solid solution can be thus produced. In terms of the reactivity and the cycling stability, it is preferred that the product is quenched with liquid nitrogen or the like after calcining. The calcining may be carried out in the air at a calcining temperature of 700° C. to 1000° C. (e.g. 800° C. to 900° C.) for 3 to 20 hours (e.g. 12 hours).

Oxidation of the precursor gives the lithium-containing transition metal oxide solid solution. For example, such oxidation processes include (1) a charge or a charge-discharge within a predetermined potential range, in more detail, a charge or a charge-discharge starting from a low potential range so that the crystal structure of the lithium-containing transition metal oxide solid solution does not change immediately to a great extent, (2) oxidation with an oxidant (e.g. a halogen such as bromine and chlorine), which corresponds to a charge, (3) oxidation with a redox mediator, and the like.

To carry out the oxidation according to the above process (1), which is comparatively an easy process among the oxidation processes (1) to (3), it is effective to charge or charge-discharge the precursor that is configured as a cell, an electrode or an equivalent of an electrode and to control the charge or charge-discharge such that the maximum potential does not exceed a predetermined level (i.e. a potential-regulated charge-discharge pretreatment). This makes it possible to achieve high charge capacity and high capacity retention.

A desirable potential-regulated charge-discharge pretreatment involves 1 to 30 cycles of charge-discharge in the condition in which the maximum potential of the predetermined potential range with respect to a metal lithium counter electrode (the upper limit potential with respect to metal lithium or an equivalent to metal lithium in the charge-discharge) is set to within the range from 4.3 V to 4.75 V. A further desirable pretreatment involves 1 to 30 cycles of charge-discharge in the condition in which the maximum potential is set to within the range from 4.4 V to 4.6 V. The oxidation by means of the charge-discharge within the above-described range makes it possible to achieve high discharge capacity and high capacity retention. In particular, the effect of improving the capacity retention is obtained to a remarkable extent when a charge or a charge-discharge to a maximum potential of approximately 4.75 V is carried out after the oxidation (potential-regulated charge-discharge pretreatment) in order to achieve high capacity. In this case, in terms of improving the capacity retention, it is further preferred that an initial charge-discharge is performed to a predetermined upper limit potential and thereafter the upper limit potential is increased gradually (in stages). As used herein, a potential with respect to metal lithium or an equivalent to metal lithium corresponds to a potential with reference to the potential of metal lithium in electrolytic solution in which 1 mol/L of lithium ions are dissolved.

Further, after 1 to 30 cycles of the charge-discharge within the predetermined potential range with respect to the metal lithium counter electrode is complete, it is desirable to further increase the maximum potential of the predetermined charge-discharge potential range in stages.

In particular, when it is intended to utilize the capacity to a high potential such as 4.7 V or 4.75 V vs. Li (high capacity use), such gradual raise of the maximum potential of the charge-discharge potential in the oxidation can improve the durability of the electrode although the oxidation (the above charge-discharge pretreatment) is performed in a short time.

When the maximum potential (upper limit potential) of the predetermined charge-discharge potential range is raised in stages, an effective number of cycles in each stage is within the range from 1 to 10 times, but the number of cycles required is not particularly limited. Further, when the maximum potential (upper limit potential) of the predetermined charge-discharge potential range is raised in stages, an effective total number of charge-discharge cycles in the oxidation process (the sum of the numbers of charge-discharge cycles required in each stage) is within the range from 4 to 20 times, but it is not particularly limited.

When the maximum potential (upper limit potential) of the predetermined charge-discharge potential range is raised in stages, an effective increment (gain) of the potential between stages is within the range from 0.05 to 0.1 V, but it is not particularly limited.

When the maximum potential (upper limit potential) of the predetermined charge-discharge potential range is raised in stages, an effective final maximum potential (terminal maximum potential) is within the range from 4.6 V to 4.9 V. However, the final maximum potential is not limited to the above range, and the oxidation (potential-regulated charge-discharge pretreatment) may be performed to a higher terminal maximum potential as long as the above-described advantageous effects are obtained.

The minimum potential of the predetermined potential range is not particularly limited but is equal to or greater than 2 V and less than 3.5 V, more preferably equal to or greater than 2 V and less than 3 V with respect to the metal lithium counter electrode. The oxidation by means of the charge or charge-discharge within the range (potential-regulated charge-discharge pretreatment) makes it possible to achieve high discharge capacity and high capacity retention. As used herein, the potential (V) in the above-described charge-discharge refers to the potential per unit cell (single cell).

The temperature of an electrode (material) that is subjected to the charge-discharge for the oxidation (potential-regulated electrochemical pretreatment by means of a charge-discharge) may be set to a suitable value in which the functions and the advantageous effects of the present invention are not impaired. From an economical viewpoint, it is desirable that the oxidation is performed at room temperature so that any heating or cooling is specifically required. On the contrary, in terms of achieving a higher capacity and improving the capacity retention by means of the short-time charge-discharge treatment, it is desirable that the oxidation is performed at a temperature higher than room temperature.

The step (timing) to which the oxidation (potential-regulated electrochemical pretreatment by means of the charge-discharge) is applied is not particularly limited. For example, as described above, the oxidation may be performed to a cell, an electrode or an equivalent of an electrode. That is, the oxidation may be performed when the cathode active material is in the form of a powder or after it is configured as an electrode or after it is further paired with an anode in a cell. When the oxidation is performed on a cell, the oxidation condition (condition of the potential-regulated electrochemical pretreatment by means of the charge-discharge) is determined taking into account the potential profile of the electric capacity of the anode to be paired.

Performing the oxidation on a cell is superior to performing the oxidation on each electrode or each electrode equivalent because the oxidation can be performed on many electrodes at once. In contrast, performing the oxidation on each electrode or each electrode equivalent is superior to performing the oxidation on a cell because the conditions such as the oxidation potential is easier to control and variation in oxidation degree between electrodes is reduced.

The oxidant used in the oxidation process (2) is not particularly limited, and for example, halogens such as bromine and chlorine may be used. These oxidants may be used alone or in combination. The oxidation by means of the oxidant may be performed, for example, by dispersing the lithium-containing transition metal oxide solid solution in a solvent to which the solid solution is insoluble, and blowing and dissolving the oxidant into the dispersion to cause the oxidation gradually.

Next, as an embodiment of the non-aqueous organic electrolyte secondary cell of the present invention, a lithium-ion secondary cell will be described referring to the drawings. The dimension of the drawings referred to in the following embodiment is exaggerated for descriptive reasons and may be different from the actual dimension.

Figure 2:
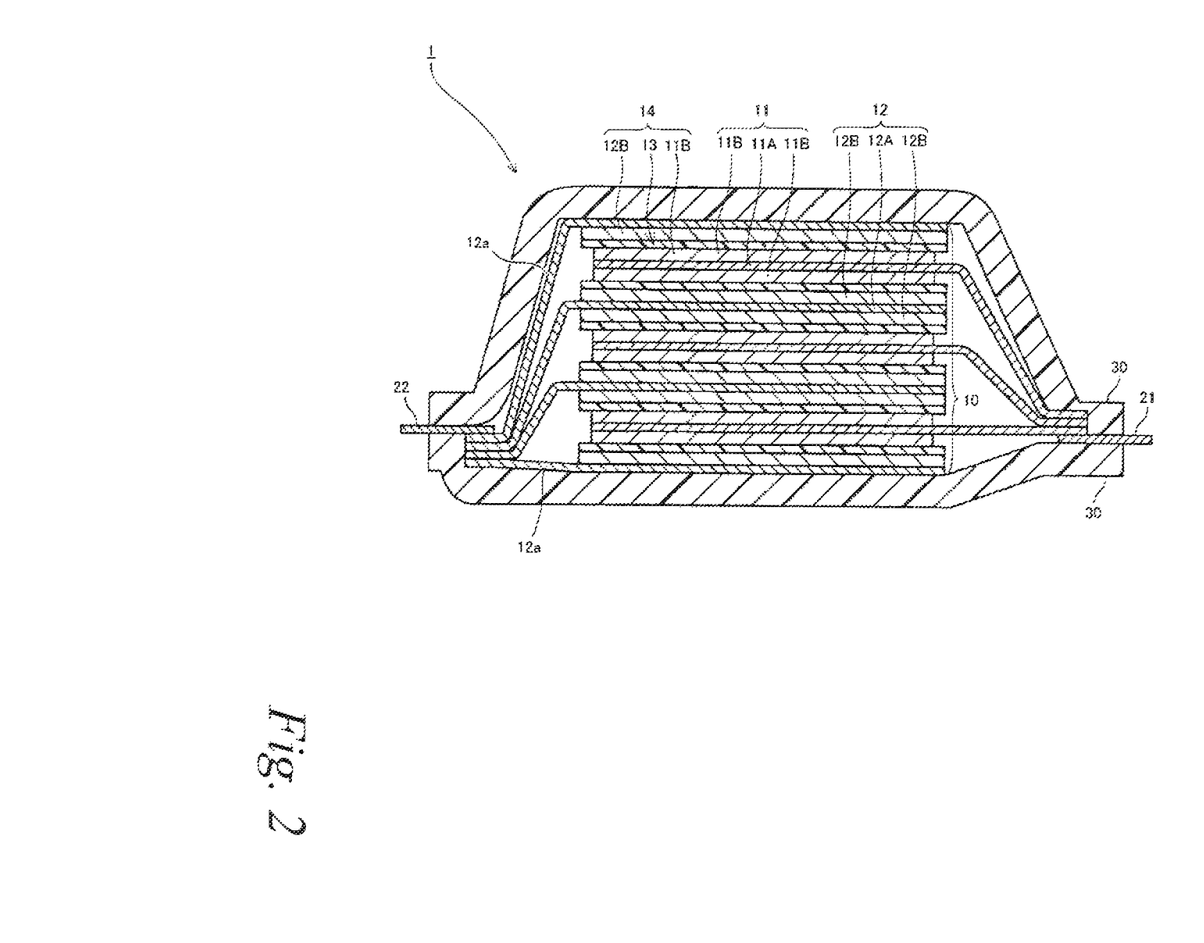
FIG. 2 is a schematic cross sectional view illustrating an example structure of a lithium-ion secondary cell, which is

FIG. 2 is a schematic cross sectional view of an example of a lithium-ion secondary cell according to an embodiment of the present invention. The illustrated lithium ion secondary cell is known as a laminated lithium ion secondary cell.

The lithium ion secondary cell 1 as illustrated in FIG. 2 includes a cell element 10 to which a cathode lead wire 21 and an anode lead wire 22 are attached and an exterior body 30 made of a laminate film in which the cell element 10 is sealed. In the embodiment, the cathode lead wire 21 and the anode lead wire 22 are drawn in the opposite directions from the exterior body 30 to the outside. Although not shown in the figure, the cathode lead wire and the anode lead wire may be drawn in the same direction from the exterior body to the outside. The cathode lead wire and the anode lead wire may be attached to cathode current collectors and anode current collectors, which are described below, by means of ultrasonic welding or resistance welding for example.

The cathode lead wire 21 and the anode lead wire 22 are made of a metal material such as aluminum (Al), copper (Cu), titanium (Ti), nickel (Ni), the alloy thereof and stainless steel (SUS). However, the material is not limited thereto, and may be selected from materials known in the art that are used for the lead wires of lithium ion secondary cells.

The cathode lead wire and the anode lead wire may be made of the same material or different materials from each other. Further, separately prepared lead wires may be connected to the cathode current collectors and anode current collectors (described below) as in the embodiment, or the cathode current collectors and the anode current collectors (described below) may be extended to form the respective lead wires. Although not shown in the figure, it is preferred that the cathode lead wire and the anode lead wire are covered with a heat-resistant and insulating heat-shrinkable tube or the like at the part drawn out of the exterior body in order that they do not cause electric leakage to affect the product (e.g. a car component, in particular electronic equipment or the like) when they come in contact with a surrounding component or wiring.

Further, although not shown in the figure, a current collector plate may be used in order to extract an electric current out of the cell. The current collector plate is electrically connected to the current collectors or the lead wire and is drawn out of the laminate film, i.e. the exterior body of the cell. The material of the current collector plate is not particularly limited, and highly conductive materials known in the art that are conventionally used for the current collector plate of lithium ion secondary cells may be used. Preferred materials of the current collector plate include, for example, aluminum (Al), copper (Cu), titanium (Ti), nickel (Ni), the alloys thereof and stainless steel (SUS). In terms of light weight, resistance to corrosion and high electrical conductivity, aluminum (Al) and copper (Cu) are more preferred. The cathode current collector plate and the anode current collector plate may be made of the same material or different materials from each other.

The exterior body 30 is preferably constituted by, for example, a film exterior material in terms of reducing the size and the weight. However, the material is not limited thereto, and materials known in the art that are used for the exterior body of lithium ion secondary cells may be used. That is, a metal can case may also be used.

For example, a polymer-metal composite laminate film with a good thermal conductivity may be used because it can be suitably used for cells for large equipment such as electric vehicles and hybrid vehicles due to the high compatibility with high power cells and the high cooling performance. To be more specific, a suitable exterior body is made of three-layer laminate film exterior material that is formed by laminating a thermal compression bonding layer of polypropylene, a metal layer of aluminum and an outer protection layer of nylon in the written order.

Instead of the above-described laminate film, the exterior body may be made of a different material, for example, a laminate film containing no metal material, a polymer film such as polypropylene film, a metal film or the like.

A typical configuration of the exterior body can be described as the laminate structure: outer protection layer/metal layer/thermal compression bonding layer (Each of the outer protection layer and the thermal compression bonding layer may be composed of a plurality of layers.). The metal layer may be any layer that serves as a moisture-impermeable barrier membrane. Not only an aluminum foil, but also a stainless steel foil, a nickel foil, a plated iron foil and the like may be used as the metal layer. However, an aluminum foil is suitably used due to the thin and light properties and the good processability.

Structures that can be used for the exterior body include, as expressed in the form like (outer protection layer/metal layer/thermal compression bonding layer), nylon/aluminum/non-stretched polypropylene, polyethylene terephthalate/aluminum/non-stretched polypropylene, polyethylene terephthalate/aluminum/polyethylene terephthalate/non-stretched polypropylene, polyethylene terephthalate/nylon/aluminum/non-stretched polypropylene, polyethylene terephthalate/nylon/aluminum/nylon/non-stretched polypropylene, polyethylene terephthalate/nylon/aluminum/nylon/polyethylene, nylon/polyethylene/aluminum/linear low-density polyethylene, polyethylene terephthalate/polyethylene/aluminum/polyethylene terephthalate/low-density polyethylene, polyethylene terephthalate/nylon/aluminum/low-density polyethylene/non-stretched polypropylene, and the like.

As illustrated in FIG. 2, the cell element 10 includes a plurality of cathodes 11 and a plurality of anodes 12 that are laminated to each other, in which each cathode 11 includes cathode active material layers 11B that are formed on both main faces of a cathode current collector 11A, and each anode 12 includes anode active material layers 12B that are formed on both main faces of an anode current collector 12A. Further, the cell element 10 is configured such that the cathode active material layer 11B that is formed on one main face of the cathode current collector 11A of a cathode 11 is opposed to the anode active material layer 12B that is formed on one main face of the anode current collector 12A of an adjacent anode 12 across an electrolyte layer 13. As described above, a cathode, an electrolyte layer and an anode are laminated repetitively in the written order.

In this way, a cathode active material layer 11B, an electrolyte layer 13 and an anode active material layer 12B that are adjacent to each other constitute a single cell layer 14. That is, the lithium ion secondary cell 1 of the present embodiment includes a laminated plurality of single cell layers 14 that are electrically connected in parallel to each other. The cathodes and the anodes may include only one active material layer that is formed on one main face of the current collector. In this embodiment, for example, an anode current collector 12a that is located at the outermost layer of the cell element 10 has only one anode active material layer 12B that is formed on one side thereof.

Further, on the outer periphery of each single cell layer, an insulating layer (not shown) may be provided to ensure insulation between the adjacent cathode current collector and anode current collector. The insulating layers hold the electrolyte contained in the electrolyte layers or the like. It is preferred that the insulating layers are formed on the outer peripheries of the single cells and are made of a material that can prevent leakage of the electrolyte. Specifically, materials that can be used include general plastics such as polypropylene (PP), polyethylene (PE), polyurethane (PUR), polyamide resins (PA), polytetrafluoroethylene (PTFE), polyvinylidene fluoride (PVDF) and polystyrene (PS), and thermoplastic olefin rubbers, and the like. Silicone rubbers may also be used.

The cathode current collectors 11A and the anode current collectors 12A are constituted by an electrically conductive material. The size of the current collectors may be selected according to the intended use of the cell. For example, for a large cell that requires high energy density, the current collectors having a large area are used. The thickness of the current collectors is not particularly limited, either. The thickness of the current collectors is typically within the range approximately from 1 to 100 μm. The shape of the current collectors is not particularly limited, either. Instead of current collector foils, mesh current collectors (expanded mesh, etc.) and the like may also be used in the cell element 10 as illustrated in FIG. 2.

If an alloy film, which is an example of the anode active material, is directly formed on the anode current collectors 12A by means of sputtering or the like, it is desirable to use current collector foils.

The material of the current collectors is not particularly limited. For example, metal materials and resin materials that contain an electrically conductive polymer or non-conductive polymer and an electrically conductive filler may be used.

Specifically, metal materials that can be used include aluminum (Al), nickel (Ni), iron (Fe), stainless steel (SUS), titanium (Ti), copper (Cu) and the like. In addition, a clad metal of nickel (Ni) and aluminum (Al), a clad metal of copper (Cu) and aluminum (Al), plated materials made of a combination of these metals may be preferably used. Further, a metal foil with the surface coated with aluminum (Al) may also be used. Among them, in terms of electron conductivity and cell operating potential and the like, aluminum (Al), stainless steel (SUS), copper (Cu) and nickel (Ni) are preferred.

Further, electrically conducive polymers that can be used include, for example, polyaniline, polypyrrole, polythiophene, polyacetylene, polyparaphenylene, polyphenylene vinylene, polyacrylonitrile, polyoxadiazole and the like. Since these electrically conductive polymers exhibit sufficient electrical conductivity without any electrically conductive filler, they are advantageous in ease of the production process and reduction in weight of the current collectors.

Non-conductive polymers that can be used include, for example, polyethylenes (PE) (high density polyethylene (HDPE), low density polyethylene (LDPE) and the like), polypropylene (PP), polyethylene terephthalate (PET), polyethernitrile (PEN), polyimide (PI), polyamideimide (PAI), polyamide (PA), polytetrafluoroethylene (PTFE), is styrene-butadiene rubber (SBR), polyacrylonitrile (PAN), polymethylacrylate (PMA), polymethylmethacrylate (PMMA), polyvinylchloride (PVC), polyvinylidene fluoride (PVDF), polystyrene (PS) and the like. These non-conductive polymers have a high withstand potential or high resistance to solvent.

According to need, an electrically conductive filler may be added to the electrically conductive polymer or the non-conductive polymer. In particular, if the base resin of the current collectors is exclusively made of a non-conductive polymer, it is essential to add an electrically conductive filler in order to impart electrical conductivity to the resin. Any material that has electrical conductivity may be used as the electrically conductive filler without any specific limitation. For example, metals and electrically conductive carbon are materials that have high electrical conductivity, high withstand potential and good barrier property against lithium ions.

Regarding metals, preferred fillers are those containing at least one metal selected from the group consisting of nickel (Ni), titanium (Ti), aluminum (Al), copper (Cu), platinum (Pt), iron (Fe), chromium (Cr), tin (Sn), zinc (Zn), indium (In), antimony (Sb) and pottasium (K) or the alloy thereof or the oxide thereof. Regarding electrically conductive carbons, preferred fillers are those containing at least one material selected from the group consisting of acetylene black, vulcan, black pearl, carbon nanofiber, to Ketjen black, carbon nanotube, carbon nanohorn, carbon nanobaloon and fullerene. The electrically conductive filler may be added in any amount that can impart sufficient electrical conductivity to the current collectors, typically within the range approximately from 5 to 35 mass %.

However, the filler is not limited to the above materials, and any material known in the art that is used for the current collector of lithium ion secondary cells may be used.

The cathode active material layers 11B contain the above-described cathode active material as the cathode active material, and if necessary, may further contain a binder or a conductor aid.

Binders that can be used include, for example, the following materials, but are not particularly limited.

Thermoplastic polymers such as polyethylene (PE), polypropylene (PP), polyethylene terephthalate (PET), polyethernitrile (PEN), polyacrylonitrile (PAN), polyimide (PI), polyamide (PA), cellulose, carboxymethylcellulose (CMC), ethylene-vinyl acetate copolymer, polyvinylidene chloride (PVC), styrene-butadiene rubber (SBR), isoprene rubber, butadiene rubber, ethylene-propylene rubber, ethylene-propylene-diene copolymer, styrene-butadiene-styrene block copolymer and the hydrogenated product thereof, and styrene-isoprene-styrene block copolymer and the hydrogenated product thereof; fluororesins such as polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), and polyvinylfluoride (PVF); vinylidene fluoride-based fluororubbers such as vinylidene fluoride-hexafluoropropylene-based fluororubbers (VDF-HFP-based fluorine-containing rubber), vinylidene fluoride-hexafluoropropylene-tetrafluoroethylene-based fluororubbers (VDF-HFP-TFE-based fluororubbers), vinylidenefluoride-pentafluoropropylene-based fluororubbers (VDF-PFP-based fluororubbers), vinylidenefluoride-pentafluoropropylene-tetrafluoroethylene-based fluororubbers (VDF-PFP-TFE-based fluororubbers), vinylidenefluoride-perfluoromethylvinylether-tetrafluoroethylene-based fluororubbers (VDF-PFMVE-TFE-based fluororubbers), and vinylidenefluoride-chlorotrifluoroethylene-based fluororubbers (VDF-CTFE-based fluororubbers); epoxy resins; and the like. Among them, polyvinylidene fluoride, polyimide, styrene-butadiene rubber, carboxymethylcellulose, polypropylene, polytetrafluoroethylene, polyacrylonitrile and polyamide are more preferred. These preferred binders have good heat resistance and are stable at both cathode potential and anode potential due to the very wide potential window, and can therefore be used for the cathode (and anode) active material layers.

However, the binder is not limited thereto, and any material known in the art that is conventionally used for the binder of lithium ion secondary cells may be used. These binders may be used alone or in combination of two or more.

The binder may be contained in the cathode active material layers in any amount that can bind the cathode active material, preferably in the amount of 0.5 to 15 mass %, more preferably in the amount of 1 to 10 mass % with respect to the cathode active material layers.

A conductor aid is added in order to improve the electrical conductivity of the cathode active material layers. Such conductor aids include, for example, carbon materials including carbon black such as acetylene black, graphite, vapor growth carbon fiber and the like. If a conductor aid is contained in the cathode active material layers, it effectively forms an electron network in the cathode active material layers and can thereby improve the output properties of the cell.

However, the conductor aid is not limited thereto, and any material known in the art that can be used for the conductor aid of lithium ion secondary cells may be used. These conductor aids may be used alone or in combination of two or more.

As described above, in the present invention, the content of a carbon material as the conductor aid is preferably equal to or less than 5 mass % with respect to the total amount of the cathode active material, the carbon material and the binder. Also, the content of the binder is preferably equal to or less than 5 mass % with respect to the total amount.

Further, an electrically conductive binder, which serves as both conductor aid and binder, may be used in place of the conductor aid and the binder, or it can be used in combination with either one or both of the conductor aid and the binder. Such electrically conductive binders include, for example, TAB-2 (Hosen Corp.), which is commercially available.

The density of the cathode active material layers is preferably within the range from 2.5 g/cm$^3$ to 3.0 g/cm$^3$. If the density of the cathode active material layers is less than 2.5 g/cm$^3$, it is difficult to improve the weight (filling weight) per unit volume, which makes it difficult to improve the discharge capacity. If the density of the cathode active material layers is over 3.0 g/cm$^3$, the void in the cathode active material layer drastically decreases, which may decrease the permeability of non-aqueous electrolytic solution and the lithium ion diffusion.

The anode active material layers 12B contain an anode material that is capable of occluding and releasing lithium, a lithium alloy or lithium, and if necessary, may further contain a binder or a conductor aid. As the binder and the conductor aid, the above-described materials may be used.

Anode materials capable of occluding and releasing lithium include, for example, carbon materials (including those containing 10 mass % or less of silicon nanoparticles) such as highly crystalline graphite (natural graphite, artificial graphite, etc.), low crystalline carbon (soft carbon, hard carbon), carbon black (Ketjen black, acetylene black, channel black, lamp black, oil-furnace black, thermal black, etc.), fullerene, carbon nanotube, carbon nanofiber, carbon nanohorn and carbon fibril; simple substances of elements that can form an alloy with lithium such as silicon (Si), germanium (Ge), tin (Sn), lead (Pb), aluminum (Al), indium (In), zinc (Zn), hydrogen (H), calcium (Ca), strontium (Sr), barium (Ba), ruthenium (Ru), rhodium (Rh), iridium (Ir), palladium (Pd), platinum (Pt), silver (Ag), gold (Au), cadmium (Cd), mercury (Hg), gallium (Ga), thallium (Tl), carbon (C), nitrogen (N), antimony (Sb), bismuth (Bi), oxygen (O), sulfur (S), selenium (Se), tellurium (Te) and chlorine (Cl), and oxides (silicon monoxide (SiO), $SiO_x$ (0<x<2), tin dioxide ($SnO_2$), $SnO_x$ (0<x<2), $SnSiO_3$, etc.), carbides (silicon carbide (SiC), etc.) and the like containing these elements; metal materials such as metal lithium; and lithium-transition metal composite oxides such as lithium-titanium composite oxide (lithium titanium oxide ($Li_4Ti_5O_{12}$)). However, the anode material is not limited thereto, and any material known in the art that is used as the anode active material of lithium ion secondary cells may be used. These anode active materials may be used alone or in combination of two or more.

Further, in the present invention, it is desirable that the carbon material is composed of a non-flake graphite material with the surface coated with an amorphous carbon layer, and has a BET specific surface area within the range from 0.8 m$^2$/g to 1.5 m$^2$/g and a tap density within the range from 0.9 g/cm$^3$ to 1.2 g/cm$^3$.

The carbon material composed of a non-flake particulate graphite material with the surface coated with an amorphous carbon layer is preferred because the graphite layered structure exhibits high diffusion of lithium ions. Further, it is preferred that the carbon material has a BET specific surface area within the range from 0.8 m²/g to 1.5 m²/g because such carbon materials can further improve the capacity retention. Furthermore, if the carbon material has a tap density within the range from 0.9 g/cm³ to 1.2 g/cm³, it becomes possible to improve the weight (filling weight) per unit volume and the charge capacity.

It is preferred that the anode active material layers containing at least the carbon material and the binder have a BET specific surface area within the range from 2.0 m²/g to 3.0 m²/g. The anode active material layers having a BET specific surface area within the range from 2.0 m²/g to 3.0 m²/g can improve the permeability of non-aqueous electrolytic solution and the capacity retention and can prevent gas generation caused by degradation of non-aqueous electrolytic solution.

Further, it is preferred that the anode active material layers containing at least the carbon material and the binder have a BET specific surface area within the range from 2.01 m²/g to 3.5 m²/g after press molding. The anode active material layers having a BET specific surface area within the range from 2.01 m²/g to 3.5 m²/g after press molding can improve the permeability of non-aqueous electrolytic solution and the capacity retention and can prevent gas generation caused by degradation of non-aqueous electrolytic solution.

Further, before and after press molding of the anode active material layers at least containing the carbon material and the binder, the increase of the BET specific surface area is preferably within the range from 0.01 m²/g to 0.5 m²/g. Since the BET specific surface area of the anode active material layers after press molding can be adjusted to within the range from 2.01 m²/g to 3.5 m²/g, it is possible to improve the permeability of non-aqueous electrolytic solution and the capacity retention and to prevent gas generation caused by degradation of non-aqueous electrolytic solution.

Further, the thickness of each active material layer (an active material layer on either one side of the current collectors) is not particularly limited, and the knowledge on cells in the art can be suitably used as a reference. For example, considering the intended use (output-oriented, energy-oriented, etc.) and the ion conductivity of the cell, the thickness of each active material layer is typically within the range from 1 to 500 µm, preferably within the range from 2 to 100 µm.

If the optimal particle size for exerting the inherent effects varies with each active material, a mixture of materials each having the optimal particle size for exerting the inherent effects may be used, and it is not required to equalize the particle size of all active materials.

For example, if a particulate oxide is used as the cathode active material, the average particle size of the oxide is not particularly limited and may be approximately the same as the average particle size of the cathode active material contained in conventional cathode active material layers. In terms of increasing the power output, the particle size is preferably within the range from 1 to 20 µm. As used herein, the term "particle size" means the maximum distance between two points on the contour of an active material particle (on an observation plane) that is observed under observation means such as a scanning electron microscope (SEM) and a transmission electron microscope (TEM). The "average particle size" is calculated as the average particle size of the particles observed in several to tens of fields of view of the observation means such as a scanning electron microscope (SEM) and a transmission electron microscope (TEM). The particle size and the average particle size of the other components may be defined similarly.

However, it should be understood that they are not limited to the above range and may be beyond the range as long as the functions and the advantageous effects of the present invention are effectively obtained.

The electrolyte layer 13 may be constituted by, for example, a layer of an electrolytic solution supported by a separator (described below), a polymer gel electrolyte or a solid polymer electrolyte, or by a laminate of a polymer gel electrolyte or a solid polymer electrolyte.

Preferred electrolytic solutions are those generally used in lithium ion cells. Specifically, the supporting salt (lithium salt) is dissolved in organic solvent. The lithium salt may include at least one lithium salt selected from, for example, salts with an inorganic acid anion such as lithium hexafluorophosphate ($LiPF_6$), lithium tetrafluoroborate ($LiBF_4$), lithium perchlorate ($LiClO_4$), lithium hexafluoroarsenate ($LiAsF_6$), lithium hexafluorotantalate ($LiTaF_6$), lithium tetrachloroaluminate ($LiAlCl_4$) and lithium decachloroborate ($Li_2B_{10}Cl_{10}$); salts with an organic acid anion such as lithium trifluoromethanesulfonate ($LiCF_3SO_3$), lithium bis(trifluoromethanesulfonyl)imide ($Li(CF_3SO_2)_2N$) and lithium bis(pentafluoroethanesulfonyl)imide ($Li(C_2F_5SO_2)_2N$); and the like.

Among them, lithium hexafluorophosphate ($LiPF_6$) is preferably used because it has an effect of reducing corrosion of an aluminum foil, a typical cathode current collector material, at a high potential (a cell potential of 4.4 V or more) (This is probably due to formation of a passivated aluminum fluoride coating.).

Further, the organic solvent may include, for example, at least one organic solvent selected from the group consisting of cyclic carbonates, fluorinated cyclic carbonates, chain carbonates, fluorinated chain carbonates, aliphatic carboxylates, fluorinated aliphatic carboxylates, γ-lactones, fluorinated γ-lactones, cyclic ethers, fluorinated cyclic ethers, chain ethers and fluorinated chain ethers.

Cyclic carbonates that can be used include, for example, propylene carbonate (PC), ethylene carbonate (EC) and butylene carbonate (BC). Fluorinated cyclic carbonates that can be used include, for example, fluoroethylene carbonate (FEC). Chain carbonates that can be used include, for example, dimethylcarbonate (DMC), diethylcarbonate (DEC), ethylmethylcarbonate (EMC), methylpropylcarbonate (MPC), ethylpropylcarbonate (EPC) and dipropylcarbonate (DPC). Aliphatic carboxylate that can be used include, for example, methyl formate, methyl acetate and ethyl propionate. γ-Lactones that can be used include, for example, γ-butyrolactone. Cyclic ethers that can be used include, for example, tetrahydrofuran, 2-methyltetrahydrofuran and 1,4-dioxane. Chain ethers that can be used include, for example, 1,2-ethoxyethane (DEE), ethoxymethoxyethane (EME), diethylether, 1,2-dimethoxyethane and 1,2-dibutoxyethane. Other substances that can be used include nitriles such as acetonitrile and amides such as dimethylformamide. They may be used alone or in combination of two or more.

It is preferred that the solvent of the non-aqueous electrolyte is a mixture solvent of a cyclic carbonate having a high dielectric constant and a chain carbonate having a low viscosity. Since cyclic carbonates easily degrade by oxidation in a high potential condition, the mixing ratio thereof is desirably within the range from 10 to 30 vol %. Further, since cyclic carbonates and chain carbonates easily degrade by oxidation in a high potential condition, it is desirable that they are partly fluorinated.

The electrolytic solution may contain an additive. Such additives include organic sulfone compounds such as sultone derivatives and cyclic sulfonates, organic disulfone compounds such as disultone derivatives and cycle disulfonates, vinylene carboante derivatives, ethylene carbonate derivatives, ester derivatives, dihydric phenol derivatives, ethylene glycol derivatives, terphenyl derivatives, phosphate derivatives and the like. These substances form a coating on the surface of the anode active material so as to reduce gas generation of the cell, and can thereby further improve the capacity retention.

Organic sulfone compounds that can be used include, for example, 1,3-propane sultone (saturated sultone), 1,3-propene sulfone (unsaturated sultone). Organic disulfone compounds that can be used include, for example, methylene methanedisulfonate. Vinylene carbonate derivatives that can be used include, for example, vinylene carboanate (VC). Ethylene carbonate derivatives that can be used include, for example, fluoroethylene carbonate (FEC). Ester derivatives that can be used include, for example, 4-biphenylyl acetate, 4-biphenylyl benzoate, 4-biphenylylbenzyl carboxylate and 2-biphenylyl propionate. Dihydric phenol derivatives that can be used include, for example, 1,4-diphenoxybenzene and 1,3-diphenoxybenzene. Ethylene glycol derivatives that can be used include, for example, 1,2-diphenoxyethane, 1-(4-biphenylyloxy)-2-phenoxyethane and 1-(2-biphenylyloxy)-phenoxyethane. Terphenyl derivatives that can be used include, for example, o-terphenyl, m-terphenyl, p-terphenyl, 2-methyl-o-terphenyl and 2,2-dimethyl-o-terphenyl. Phosphate derivates that can be used include, for example, triphenylphosphate.

Separators that can be used include, for example, a fine porous film, a porous plate and a nonwoven fabric that are made of a polyolefin such as polyethylene (PE) and polypropylene (PP).

Polymer gel electrolytes that can be used include those containing the components, namely a polymer and electrolytic solution, in a proportion known in the art. For example, in terms of the ion conductivity and the like, the content is desirably within the range from several mass % to 98 mass %.

The polymer gel electrolyte is formed by impregnating an ion-conductive solid polymer electrolyte with the above-described electrolytic solution that is generally used in lithium ion secondary cells. However, the polymer gel electrolyte is not limited thereto and may be composed of a polymer matrix with no ion conductivity and the electrolytic solution held in the matrix.

Polymers with no lithium ion conductivity that can be used for the polymer gel electrolyte include, for example, polyvinylidene fluoride (PVDF), polyvinyl chloride (PVC), polyacrylonitrile (PAN), polymethyl methacrylate (PMMA) and the like. However, the polymer is not limited thereto. Since polyacrylonitrile (PAN) and polymethylmethacrylate (PMMA) rather have little ion conductivity, they may also be classified into ion-conductive polymers. However, in the present application, they are is described as examples of the polymers with no ion-conductivity that are used for the polymer gel electrolyte.

Solid polymer electrolytes that can be used are composed of, for example, the above lithium salt that is dissolved in polyethylene oxide (PEO), polypropylene oxide (PPO) or the like and does not contain any organic solvent. Accordingly, if the electrolyte layers are constituted by a solid polymer electrolyte, there is no risk of leakage of fluid from the cell, which can improve the reliability of the cell.

A thinner electrolyte layer is preferred in terms of reducing the internal resistance. The thickness of the electrolytic layer is typically within the range from 1 to 100 µm, preferably from 5 to 50 µm.

The matrix polymer of the polymer gel electrolyte or the solid polymer electrolyte can form a cross-linked structure so as to exhibit high mechanical strength. To form a cross-linked structure, a suitable polymerization initiator may be used to polymerize a polymerizable polymer for the polymer electrolyte (e.g. polyethylene oxide (PEO) and polypropylene oxide (PPO)) by thermal polymerization, ultraviolet polymerization, radiation polymerization, electron beam polymerization or the like.

Next, the method for manufacturing the above-described lithium ion secondary cell will be described with some examples.

An example of the method for manufacturing the lithium ion secondary cell will be described. First, the cathodes are manufactured. For example, if a particulate cathode active material is used, cathode slurry is prepared by mixing the above-described cathode active material with a conductor aid, a binder and a viscosity adjusting solvent according to need.

Then, the cathode slurry is applied to the cathode current collectors and is dried and compression-molded so that the cathode active material layers are formed.

Further, the anodes are manufactured. For example, if a particulate anode active material is used, anode slurry is prepared by mixing an anode active material with a conductor aid, a binder and a viscosity adjusting solvent according to need. Thereafter, the anode slurry is applied to the anode current collectors, and is dried and compression-molded so that the anode active material layers are formed.

Then, after cathode lead wires are attached to the cathodes and anode lead wires are attached to the anodes, the cathodes, the separators and the anodes are laminated with each other. Furthermore, the laminate is sandwiched between polymer-metal composite laminate sheets, and the outer edge part is heat-sealed except one side so that an exterior body pouch is formed.

Thereafter, a non-aqueous electrolyte that contains a lithium salt such as lithium hexafluorophosphate and an organic solvent such as ethylene carbonate is prepared, and the electrolyte is injected into the exterior body from the opening, and the opening of the exterior body is heat-sealed. In this way, the laminated lithium ion secondary cell is completed.

Another example of the method for manufacturing the lithium ion secondary cell will be described. First, the cathodes are manufactured. For example, if a particulate cathode active material is used, cathode slurry is prepared by mixing the above-described precursor of the lithium-containing transition metal oxide solid solution with a conductor aid, a binder and a viscosity adjusting solvent according to need.

Then the cathode slurry is applied to the cathode current collectors, and is dried and compression-molded so that the cathode active material layers are formed.

Further, the anodes are manufactured. For example, if particulate anode active material is used, anode slurry is prepared by mixing the anode active material with a conductor aid, a binder and a viscosity adjusting solvent according to need. Thereafter, the anode slurry is applied to the anode current collectors, and is dried and compression-molded so that anode active material layers are formed.

Then, after cathode lead wires are attached to the cathodes and the anode lead wires are attached to the anodes, the cathodes, the separators and the anodes are laminated with each other. Further, the laminate is sandwiched between polymer-metal composite laminate sheets, and the outer edge part is heat-sealed except one side so that an exterior body pouch is formed.

Thereafter, a non-aqueous electrolyte that contains a lithium salt such as lithium hexafluorophosphate and an organic solvent such as ethylene carbonate is prepared, and the electrolyte is injected into the exterior body from the opening, and the opening of the exterior body is heat-sealed. Furthermore, the above-described predetermined charge or charge-discharge is performed. In this way, a laminated lithium ion secondary cell is completed.

Examples

Hereinafter, the present invention will be described in more detail based on examples, however the present invention is not limited to these examples.

1. Manufacture of Cathode 1.1 Cathode C11

(Synthesizing Cathode Active Material)

As a cathode active material Ca1, the lithium-containing transition metal oxide of the following compositional formula was synthesized by a composite carbonate method.

$$Li_{1.5}[Ni_{0.25}Co_{0.25}Mn_{0.75}[Li]_{0.25}]O_3$$

That is, sulfates of nickel (Ni), cobalt (Co) and manganese (Mn) were used as the starting materials to prepare a 2 mol/L sulfate aqueous solution. A 2 mol/L sodium carbonate aqueous solution was used as a precipitating agent, and a 0.2 mol/L ammonia aqueous solution was used as a pH adjusting agent.

The sodium carbonate aqueous solution was added dropwise to the composite sulfate aqueous solution while stirring with a magnetic stirrer, so that the precursor was precipitated. Thereafter, the solution was filtered under reduced pressure, and the precipitate deposited on a filter paper was dried. The composite hydroxide precursor was thus obtained.

Thereafter, the obtained precursor was mixed and grinded with lithium carbonate in a predetermined molar ratio. The mixture was pre-calcined at 500° C. and was further calcined at 800° C. to 1000° C. in the air for 12 to 24 hours. The objective material was thus obtained. The charge capacity, the BET specific surface area and 50% cumulative diameter in the particle size distribution by mass (D50) of the obtained cathode active material Ca1 are shown in Table 1.

(Preparing Cathode Slurry)

Cathode active material: the above-described lithium-containing transition metal oxide 100 parts by mass
Conductor aid: flake graphite 1.0 parts by mass
Conductor aid: acetylene black 3.0 parts by mass
Binder: polyvinylidene fluoride (PVDF) 3.0 parts by mass
Solvent: N-methylpyrolidone (NMP) 65 parts by mass (Manufacturing Cathode Slurry)

The binder (3.0 parts by mass) was dissolved into 30 parts by mass of NMP to prepare a binder solution. Then, 33.0 parts by mass of the binder solution was added to a powder mixture of 4.0 parts by mass of the conductor aids and 100 parts by mass of the cathode active material. The mixture was mixed in a planetary mixer (PVM 100, Asada Iron Works, Co., Ltd.), and thereafter 35 parts by mass of NMP was added thereto. The cathode slurry (solid concentration of 62 mass %) was thus obtained.

(Applying and Drying Cathode Slurry)

The cathode slurry was applied on one side of a current collector made of a 20 μm-thick aluminum foil by means of a die coater while the current collector was being conveyed at a speed of 1 m/min. Subsequently, the current collector on which the cathode slurry was applied was placed in a hot air oven (100° C. to 110° C., drying time of 3 min) and was dried until the amount of residual NMP in the cathode active material layer was reduced to equal to or less than 0.02 wt %. Further, the slurry was also applied to the back side of the aluminum foil and was dried similarly. A sheet electrode with the cathode active material layers on both sides was thus formed.

(Pressing Cathode)

The sheet cathode thus obtained was compression-molded using a roll press and was cut into cathodes C1, which had a weight of the cathode active material layer on each side of approximately 10 mg/cm², a thickness of approximately 50 μm and a density of 2.70 g/cm³.

(Drying Cathode)

Next, the cathodes C1 were dried in a vacuum drying chamber. After the cathodes C1 were placed in the drying chamber, the pressure was reduced (100 mmHg (1.33×10⁴ Pa) at room temperature (25° C.) so that the air in the chamber was evacuated. Then, under nitrogen gas flow (100 cm³/min), the temperature was raised to 120° C. at a rate of 10° C./min. At 120° C., the pressure was reduced again to discharge the nitrogen in the chamber. After the condition was held for 12 hours, the temperature was decreased to room temperature. Cathodes C11 were thus obtained.

1.2 Cathode C22

As a cathode active material Ca2, the lithium-containing transition metal oxide of the following compositional formula was synthesized similarly by a composite carbonate method. The charge capacity, the BET specific surface area and 50% cumulative diameter in the particle size distribution by mass (D50) of the obtained cathode active material ca are shown in Table 1.

$$Li_{1.5}[Ni_{0.3}Co_{0.3}Mn_{0.7}[Li]_{0.2}]O_3$$

Then, the same process was repeated for this cathode active material, so that the cathodes C22 were obtained.

1.3 Cathode C33

As a cathode active material Ca3, the lithium-containing transition metal oxide of the following compositional formula was synthesized similarly by a composite carbonate method. The charge capacity, the BET specific surface area and 50% cumulative diameter in the particle size distribution by mass (D50) of the obtained cathode active material Ca3 are shown in Table 1.

$$Li_{1.5}[Ni_{0.45}Mn_{0.85}[Li]_{0.2}]O_3$$

Then, the same process was repeated for this cathode active material so that the cathodes C33 were obtained.

1.4 Cathode C44

As a cathode active material Ca4, the lithium-containing transition metal oxide of the following compositional formula was synthesized similarly by a composite carbonate method. The charge capacity, the BET specific surface area, 50% cumulative diameter in the particle size distribution by mass (D50), the charge-discharge efficiency ratio η and the temperature characteristic coefficient τ of the obtained cathode active material Ca4 are shown in Table 1.

$$Li_{1.5}[Ni_{0.525}Mn_{0.825}[Li]_{0.15}]O_3$$

Then, the same process was repeated for this cathode active material so that the cathodes C44 were obtained.

TABLE 1

| Cathode Active Material | $Li_{1.5}[Ni_aCo_bMn_c[Li]_d]O_3$ | | | | | | |
|---|---|---|---|---|---|---|---|
| | Ni a | Co b | Mn c | [Li] d | a + b + c | BET ($m^2/g$) | D50 (μm) |
| Ca1 | 0.25 | 0.25 | 0.75 | 0.25 | 1.25 | 1.2 | 5.8 |
| Ca2 | 0.30 | 0.30 | 0.70 | 0.20 | 1.30 | 1.4 | 5.8 |
| Ca3 | 0.45 | 0 | 0.85 | 0.20 | 1.30 | 2.6 | 5.8 |
| Ca4 | 0.525 | 0 | 0.625 | 0.15 | 1.35 | 3.2 | 6.3 |

2. Manufacture of Anode

2.1 Anode A11

(Preparing Anode Slurry)
  Anode active material: natural graphite 100 parts by mass
  Conductor aid: acetylene black 1.0 part by mass
  Binder: polyvinylidene fluoride (PVDF) 5.0 parts by mass
  Solvent: N-methylpyrolidone (NMP) 97 parts by mass
  (Manufacturing Anode Slurry)

The binder (5.0 parts by mass) was dissolved into 50 parts by mass of NMP to prepare a binder solution. Then, 55.0 parts by mass of the binder solution was added to a powder mixture of 1.0 part by mass of the conductor aid and 100 parts by mass of the natural graphite. The mixture was mixed in a planetary mixer (PVM 100, Asada Iron Works, Co. Ltd.), and thereafter, 47 parts by mass of NMP was added thereto. An anode slurry (solid concentration of 52 mass %) was thus obtained.

(Applying and Drying Anode Slurry)

The anode slurry was applied on one side of a current collector made of a 10 μm-thick electrolytic copper foil by means of a die coater while the current collector was being conveyed at a speed of 1.5 m/min. Subsequently, the current collector on which the anode slurry was applied was placed in a hot air oven (100° C. to 110° C., drying time of 2 min) and was dried until the amount of residual NMP in the anode active material layer was reduced to equal to or less than 0.02 wt %. Further, the slurry was also applied to the back side of the electrolytic copper foil and was dried similarly. A sheet electrode with the anode active material layers on both sides was thus formed.

The amount of application of the anodes was set to approximately 9.50 mg/cm² per each side so that the counter charge capacity ratio (A/C) between the cathodes and the anodes=1.25.

(Pressing Anode)

The sheet anode thus obtained was compression-molded using a roll press and was cut into anodes A1, which had a weight of the anode active material layer on each side of approximately 11.5 mg/cm² and a density of 1.45 g/cm³. The surface of the anodes A1 was observed, and no crack was found.

(Drying Anode)

Next, the anodes A1 thus manufactured were dried in a vacuum drying chamber. After the anodes A1 were placed in the drying chamber, the pressure was reduced (100 mmHg (1.33×10⁴ Pa)) at room temperature (25° C.) so that the air in the chamber was evacuated. Then, under nitrogen gas flow (100 cm³/min), the temperature was raised to 135° C. at a rate of 10° C./min. At 135° C., the pressure was reduced again to discharge the nitrogen in the chamber. After this condition was held for 12 hours, the temperature was decreased to room temperature. Anodes A11 were thus obtained.

2.2 Anode A12

Anodes A12 were obtained by repeating the same process as that of the anode A11 except that the weight of the anode active material layer per each side was set to approximately 9.25 mg/cm² so that the counter charge capacity ratio (A/C) between the cathodes and the anodes becomes 1.10.

2.3 Anode A13

Anodes A13 were obtained by repeating the same process as that of the anode A11 except that the weight of the anode active material layer per each side was set to approximately 10.3 mg/cm² so that the counter charge capacity ratio (A/C) between the cathodes and the anodes becomes 1.35.

3. Manufacture of Battery

3.1 Example 1

Tabs were welded to the current collector foils of the cathodes C11 (active material layer area: 3.6 cm in length× 5.3 cm in width) and the anodes A11 (active material layer area: 3.8 cm in length×5.5 cm in width) that are obtained as described above, so as to set the electrode area coefficient α to "1.10".

Then, porous polypropylene separators (4.5 cm in length× 6.0 cm in width, 25 μm in thickness, porosity of 55%) were interposed between the anodes A11 and the cathodes C11 with the welded tabs so that a five-layer laminate cell element (A11-separator-C11-separator-A11-) was manufactured.

Then, the cell element was sandwiched between aluminum laminate films (5.0 cm in length×6.5 cm in width), and three sides were sealed by means of thermocompression bonding so that the cell element is housed therein.

Meanwhile, an electrolytic solution was prepared by dissolving 1.0 mol/L of $LiPF_6$ into a mixed solvent composed of 30% of ethylene carbonate (EC) and 70% of diethylcarbonate (DEC) in volume ratio, and thereafter dissolving therein 1.0 mass % of vinylene carbonate (VC), 1.0 mass % of 1,3-propanesultone and 1.0 mass % of lithium difluorophosphate as additives.

Then, 0.6 cm³/cell of the obtained electrolytic solution was injected into the laminate film container in which the cell element is housed, and thereafter the remaining one side is sealed by means of thermocompression bonding. A laminated cell having a counter charge capacity ratio (A/C) between the cathodes and the anodes of 1.25 was thus manufactured.

Thereafter, the cell element was mounted on a test cell attaching jig, and a cathode lead wire and an anode lead wire were attached to the respective tab ends of the cell element. The cell element was then subjected to the tests described below.

3.2 Example 2

A cell having a counter charge capacity ratio (A/C) between the cathodes and the anodes of 1.10 was manufacture by repeating the same process as Example 1 except that the cathodes C11 were paired with the anodes A12.

3.3 Example 3

A cell having a counter charge capacity ratio (A/C) between the cathodes and the anodes of 1.35 was manufacture by repeating the same process as Example 1 except that the cathodes C11 were paired with the anodes A13.

3.4 Examples 4 to 6

Three types of cells having counter charge capacity ratios (A/C) between the cathodes and the anodes of respectively 1.25, 1.10 and 1.35 were manufacture by repeating the process similar to Example 1 except that the cathodes C22 were paired respectively with the anodes A11, A12 and A13.

3.5 Examples 7 to 9

Three types of cells having counter charge capacity ratios (A/C) between the cathodes and the anodes of respectively 1.25, 1.10 and 1.35 were manufacture by repeating the process similar to Example 1 except that the cathodes C33 were paired respectively with the anodes A11, A12 and A13.

3.6 Examples 10 to 12

Three types of cells having counter charge capacity ratios (A/C) between the cathodes and the anodes of respectively 1.25, 1.10 and 1.35 were manufacture by repeating the process similar to Example 1 except that the cathodes C44 were paired respectively with the anodes A11, A12 and A13.

3.7 Comparative Examples 1 to 4

Four types of cells having counter charge capacity ratios (A/C) between the cathodes and the anodes of respectively 0.90, 1.00, 1.50 and 2.00 were manufacture by repeating the process similar to Example 1 except that the cathodes C11 was paired respectively with the anodes A14 to A17, which are formed by applying different amounts of the anode slurry.

4. Evaluation of Battery Characteristics

The cells prepared according to the above examples and comparative examples were subjected to an aging treatment and an activating treatment in the following conditions, and the cell characteristics thereof was then evaluated.

4.1 Aging Treatment

Anode Stabilizing Treatment

The cells were charged by a constant current method at 0.05 C for 4 hours at 25° C. (approximately 20% of the SOC). Then, the cells were further charged to 4.35 V at a rate of 0.1 C at 45° C., and the charging was then terminated. The cell was held at to the state (approximately 70% of the SOC) for approximately 0.5 days (120 hours).

4.2 Cathode Activating Treatment

Electrochemical Pre-Treatment

At 25° C., the cell was subjected to two cycles of charging by a constant current method at 0.2 C until the voltage reaches 4.45 V and discharging to 2.0 V at 0.2 C, and two cycles of charging to 4.55 V at 0.2 C and discharging to 2.0 V at 0.2 C.

In the electrochemical pre-treatment, a constant current charging method was used, and voltage was the condition for termination. However, the charging method may also be a constant-current constant-voltage charging method. Further, charge amount or time may be the condition for termination instead of voltage.

4.3 Evaluation of Performance

To evaluate the cell characteristics, the cells were charged by a constant-current constant-voltage charging method, where the cells were charged at a rate of 0.2 C until the maximal voltage reaches 4.5 V, and then were held for approximately 1 to 1.5 hours. Thereafter, the cells were discharged by a constant current discharging method at a rate of 0.2 C until the minimal voltage reaches 2.0 V. The charging and the discharging were both carried out at room temperature.

4.4 Evaluation of Lifetime

Charge-discharges at a rate of 1.0 C were repeated for 300 cycles at 45° C. The ratio of the discharge capacity at the 300th cycle to the discharge capacity at the first cycle was defined as the capacity retention.

The results are shown in Table 2 and Table 3 along with the specification of each cell.

TABLE 2

| | | Anode | | | |
|---|---|---|---|---|---|
| Type | No. | Active Material Charge Capacity (mAh/g) | Active Material Content (%) | Application Amount Per Side (mg/cm$^2$) | Anode Charge Capacity (mAh/cm$^2$) |
| Examples | 1 | A11 | 397 | 94 | 9.50 | 3.55 |
| | 2 | A12 | 397 | 94 | 9.25 | 3.45 |
| | 3 | A13 | 397 | 94 | 10.30 | 3.84 |
| | 4 | A11 | 397 | 94 | 9.50 | 3.55 |
| | 5 | A12 | 397 | 94 | 9.25 | 3.45 |
| | 6 | A13 | 397 | 94 | 10.30 | 3.84 |
| | 7 | A11 | 397 | 94 | 9.50 | 3.55 |
| | 8 | A12 | 397 | 94 | 9.25 | 3.45 |
| | 9 | A13 | 397 | 94 | 10.30 | 3.84 |
| | 10 | A11 | 397 | 94 | 9.50 | 3.55 |
| | 11 | A12 | 397 | 94 | 9.25 | 3.45 |
| | 12 | A13 | 397 | 94 | 10.30 | 3.84 |
| Comparative Examples | 1 | A14 | 397 | 94 | 6.85 | 2.56 |
| | 2 | A15 | 397 | 94 | 8.40 | 3.13 |
| | 3 | A16 | 397 | 94 | 11.50 | 4.28 |
| | 4 | A17 | 397 | 94 | 15.25 | 5.69 |

| | | Cathode | | | | |
|---|---|---|---|---|---|---|
| Type | No. | Active Material Charge Capacity (mAh/g) | Change Rate k | Active Material Content (%) | Application Amount Per Side (mg/cm$^2$) | Cathode Charge Capacity (mAh/cm$^2$) |
| Examples | 1 | C11 | 280 | 0.6 | 93 | 10.0 | 2.60 |
| | 2 | C11 | 280 | 0.6 | 93 | 10.0 | 2.60 |
| | 3 | C11 | 280 | 0.6 | 93 | 10.0 | 2.60 |
| | 4 | C22 | 277 | 0.5 | 93 | 10.0 | 2.58 |
| | 5 | C22 | 277 | 0.5 | 93 | 10.0 | 2.58 |
| | 6 | C22 | 277 | 0.5 | 93 | 10.0 | 2.58 |

TABLE 2-continued

| | | | | | | | |
|---|---|---|---|---|---|---|---|
| | 7 | C33 | 288 | 0.5 | 93 | 10.0 | 2.68 |
| | 8 | C33 | 288 | 0.5 | 93 | 10.0 | 2.69 |
| | 9 | C33 | 288 | 0.5 | 93 | 10.0 | 2.68 |
| | 10 | C44 | 267 | 0.4 | 93 | 10.0 | 2.48 |
| | 11 | C44 | 267 | 0.4 | 93 | 10.0 | 2.48 |
| | 12 | C44 | 267 | 0.4 | 93 | 10.0 | 2.48 |
| Comparative Examples | 1 | C11 | 280 | 0.6 | 93 | 10.0 | 2.60 |
| | 2 | C11 | 280 | 0.6 | 93 | 10.0 | 2.60 |
| | 3 | C11 | 280 | 0.6 | 93 | 10.0 | 2.60 |
| | 4 | C11 | 280 | 0.6 | 93 | 10.0 | 2.60 |

TABLE 3

| Type | | Electrode Combination Anode | Electrode Combination Cathode | Electrode area coefficient $\alpha$ | Charge-discharge efficiency ratio $\eta$ | Temperature characteristic coefficient $\tau$ |
|---|---|---|---|---|---|---|
| Examples | 1 | A11 | C11 | 1.10 | 1.15 | 1.15 |
| | 2 | A12 | C11 | 1.10 | 1.15 | 1.15 |
| | 3 | A13 | C11 | 1.10 | 1.15 | 1.15 |
| | 4 | A11 | C22 | 1.08 | 1.09 | 1.14 |
| | 5 | A12 | C22 | 1.08 | 1.09 | 1.14 |
| | 6 | A13 | C22 | 1.08 | 1.09 | 1.14 |
| | 7 | A11 | C33 | 1.05 | 1.08 | 1,14 |
| | 8 | A12 | C33 | 1.05 | 1.08 | 1.14 |
| | 9 | A13 | C33 | 1.05 | 1.08 | 1.14 |
| | 10 | A11 | C44 | 1.02 | 1.08 | 1.13 |
| | 11 | A12 | C44 | 1.02 | 1.08 | 1.13 |
| | 12 | A13 | C44 | 1.02 | 1.08 | 1.13 |
| Comparative Examples | 1 | A14 | C11 | 1.10 | 1.15 | 1.15 |
| | 2 | A15 | C11 | 1.10 | 1.15 | 1.15 |
| | 3 | A16 | C11 | 1.10 | 1.15 | 1.15 |
| | 4 | A17 | C11 | 1.10 | 1.15 | 1.15 |

| Type | | Counter Design Coefficient $\beta$ | Charge Capacity Ratio A/C | Cell Performance 0.2 C, 25° C. Charge Capacity (mAh/g) | Discharge Capacity (mAh/g) | Capacity Retention (%) |
|---|---|---|---|---|---|---|
| Examples | 1 | 1.10 | 1.25 | 280 | 246 | 81 |
| | 2 | 1.00 | 1.10 | 280 | 257 | 80 |
| | 3 | 1.10 | 1.35 | 280 | 238 | 81 |
| | 4 | 1.05 | 1.26 | 277 | 244 | 79 |
| | 5 | 0.95 | 1.11 | 277 | 255 | 79 |
| | 6 | 1.04 | 1.35 | 277 | 235 | 80 |
| | 7 | 1.11 | 1.25 | 288 | 253 | 82 |
| | 8 | 1.00 | 1.10 | 288 | 265 | 82 |
| | 9 | 1.10 | 1.35 | 288 | 244 | 82 |
| | 10 | 1.05 | 1.25 | 267 | 235 | 82 |
| | 11 | 0.95 | 1.10 | 267 | 247 | 81 |
| | 12 | 1.04 | 1.35 | 267 | 226 | 83 |
| Comparative Examples | 1 | 1.10 | 0.90 | 280 | 264 | 63 |
| | 2 | 1.00 | 1.00 | 280 | 260 | 77 |
| | 3 | 1.10 | 1.50 | 280 | 231 | 81 |
| | 4 | 1.10 | 2.00 | 280 | 224 | 81 |

The invention claimed is:

1. A non-aqueous organic electrolyte secondary cell, comprising:
   a cathode containing a cathode active material capable of occluding and releasing a lithium ion;
   an anode containing an anode active material capable of occluding and releasing a lithium ion;
   a separator to separate the cathode and the anode from each other;
   and an electrolytic solution constituted by a mixture of an organic solvent and a lithium salt electrolyte,
   wherein an anode charge capacity/a cathode charge capacity is within a range from 1.28 to 1.55,
   wherein the cathode active material is constituted by a lithium-containing transition metal oxide that has a layered crystal structure and is represented by the following compositional formula (1), $$Li_{1.5}[Ni_a Co_b Mn_c[Li]_d]O_3 \quad (1)$$

where a, b, c and d satisfy $0<a<1.4$, $0\leq b<1.4$, $0<c<1.4$, $0.05\leq d\leq 0.5$, $a+b+c+d=1.5$ and $1.0\leq a+b+c\leq 1.4$,
   wherein the cathode contains a binder and a carbon material as a conductor aid, and a content of the carbon material is equal to or less than 5 mass % and a content of the binder is equal to or less than 5 mass % with respect to a total amount of the cathode active material, the carbon material and the binder,
   wherein the anode active material is a non-flake particulate graphite material with the surface coated with an amorphous carbon layer and has a BET specific surface area within the range from 0.8 $m^2/g$ to 1.5 $m^2/g$, and a tap density within the range from 0.9 $g/cm^3$ to 1.2 $g/cm^3$.

* * * * *